United States Patent
Bonny

(10) Patent No.: US 10,385,881 B1
(45) Date of Patent: *Aug. 20, 2019

(54) FLOW DIVIDER ASSEMBLY

(71) Applicant: Hydro-Gear Limited Partnership, Sullivan, IL (US)

(72) Inventor: Nathan W. Bonny, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 432 days.

This patent is subject to a terminal disclaimer.

(21) Appl. No.: 15/229,928

(22) Filed: Aug. 5, 2016

Related U.S. Application Data

(63) Continuation of application No. 14/459,591, filed on Aug. 14, 2014, now Pat. No. 9,416,871, which is a continuation-in-part of application No. 14/212,571, filed on Mar. 14, 2014, now Pat. No. 9,506,561.

(60) Provisional application No. 61/793,540, filed on Mar. 15, 2013.

(51) Int. Cl.
| | |
|---|---|
| *F15B 11/16* | (2006.01) |
| *F15B 13/02* | (2006.01) |
| *F15B 13/06* | (2006.01) |

(52) U.S. Cl.
CPC ............ *F15B 13/022* (2013.01); *F15B 11/16* (2013.01); *F15B 13/06* (2013.01); *F15B 2211/20546* (2013.01); *F15B 2211/255* (2013.01); *F15B 2211/71* (2013.01); *F15B 2211/78* (2013.01)

(58) Field of Classification Search
CPC ........ F15B 11/16; F15B 11/22; F15B 13/022; F15B 13/028; F15B 13/06; F15B 2211/20546; F15B 2211/255; F15B 2211/3052; F15B 2211/40523; F15B 2211/4053; F15B 2211/40538; F15B 2211/71; F15B 2211/78; F15B 2211/782; F15B 2215/30

See application file for complete search history.

(56) References Cited

U.S. PATENT DOCUMENTS

| | | |
|---|---|---|
| 2,353,802 A | 7/1944 | Zimmermann |
| 2,862,449 A | 12/1958 | Wyland |
| 4,041,843 A | 8/1977 | Mischenko et al. |
| 4,102,425 A | 7/1978 | Marsden et al. |

(Continued)

FOREIGN PATENT DOCUMENTS

DE  2857567  8/1980

OTHER PUBLICATIONS

U.S. Appl. No. 15/360,269, filed Nov. 23, 2016.

*Primary Examiner* — Michael Leslie
*Assistant Examiner* — Matthew Wiblin
(74) *Attorney, Agent, or Firm* — Neal, Gerber & Eisenberg LLP

(57) ABSTRACT

A flow divider assembly for use with a hydraulic pump provides fluid flow to separate drive motors for use in a vehicle or other application. Flow may be provided alternatively to a first fluid side and second fluid side. First and second flow divider motors are in communication with an output of a shuttle valve. A first bypass valve is connected to the first fluid side and a second bypass valve is connected to the second fluid side, and both bypass valves have an open position and a closed position. A multi-position, pilot operated valve is operably connected to both flow divider motors and to both bypass valves. An embodiment permits the output of the system to be driven in either forward or reverse directions.

20 Claims, 17 Drawing Sheets

(56) References Cited

U.S. PATENT DOCUMENTS

| | | |
|---|---|---|
| 4,201,272 A | 5/1980 | Midolo |
| 4,223,594 A | 9/1980 | Gherner |
| 4,503,928 A | 3/1985 | Mallen-Herrero et al. |
| 4,639,203 A | 1/1987 | Zumbusch |
| 5,511,368 A | 4/1996 | Kocher |
| 6,149,221 A | 11/2000 | Mentink |
| 6,922,992 B1 | 8/2005 | Morgan |
| 6,973,783 B1 | 12/2005 | Hauser |
| 7,000,386 B1 | 2/2006 | Morgan |
| 7,041,026 B2 | 5/2006 | Okada |
| 7,526,994 B2 | 5/2009 | Hu |
| 7,988,428 B1 | 8/2011 | MacHarg |
| 2010/0050627 A1 | 3/2010 | Nelson et al. |

FLOW DIVIDER ASSEMBLY

CROSS-REFERENCE TO RELATED APPLICATIONS

This application is a continuation of U.S. application Ser. No. 14/459,591, filed Aug. 14, 2014, which is a continuation-in-part of U.S. application Ser. No. 14/212,571, filed Mar. 14, 2014, which claims priority to U.S. Provisional Patent Application No. 61/793,540, filed Mar. 15, 2013. The contents of these earlier applications are fully incorporated herein by reference in their entirety.

BACKGROUND OF THE INVENTION

This invention relates generally to flow control mechanisms for use with a hydraulic apparatus.

SUMMARY OF THE INVENTION

The inventions herein disclose flow controls for use in connection with, e.g., vehicle implements and other applications where the flow of a variable displacement, single direction pump needs to be divided to different flow paths. In certain embodiments a constant proportion flow divider may be used, while other embodiments depict the use of different valves to permit further control.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

Figure 1:
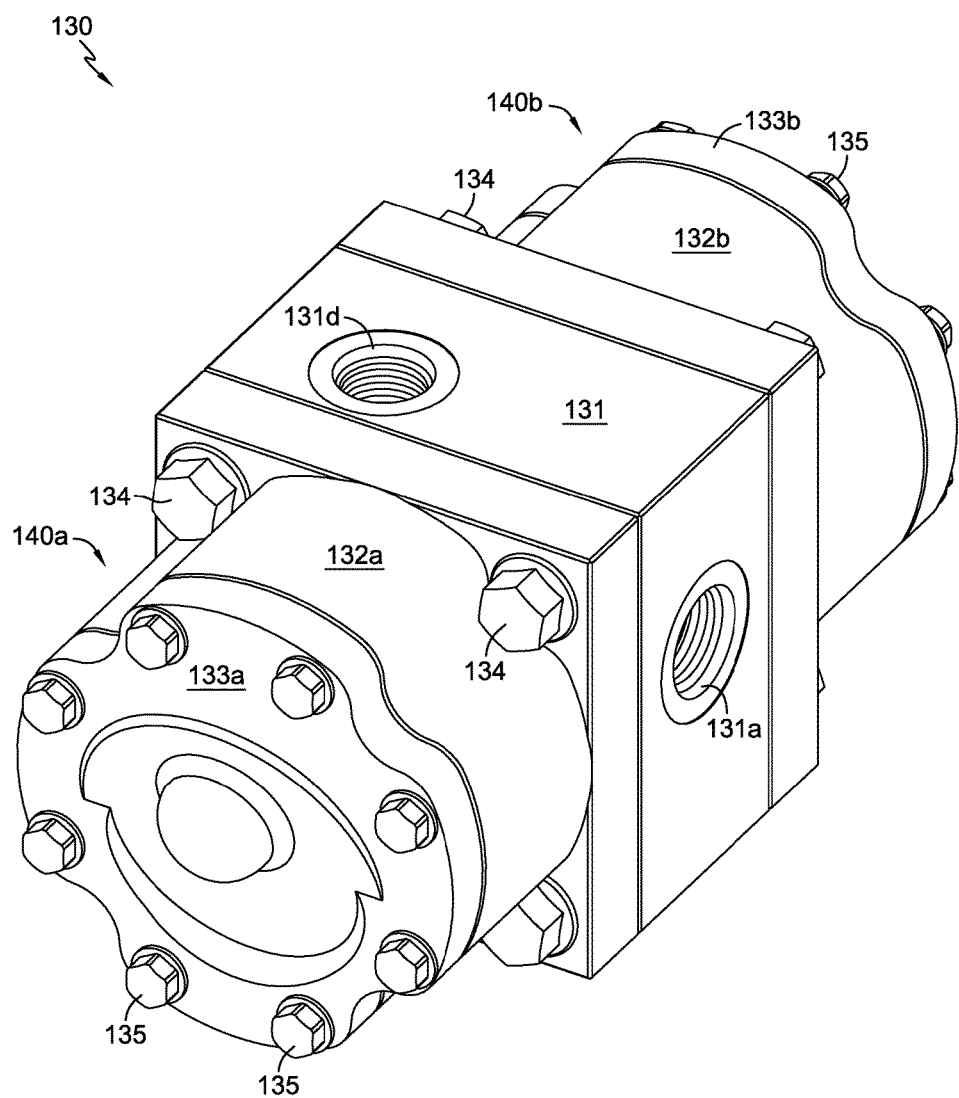
FIG. 1 is a perspective view of a dual motor flow divider assembly in accordance with a first embodiment of the invention.
Figure 2:
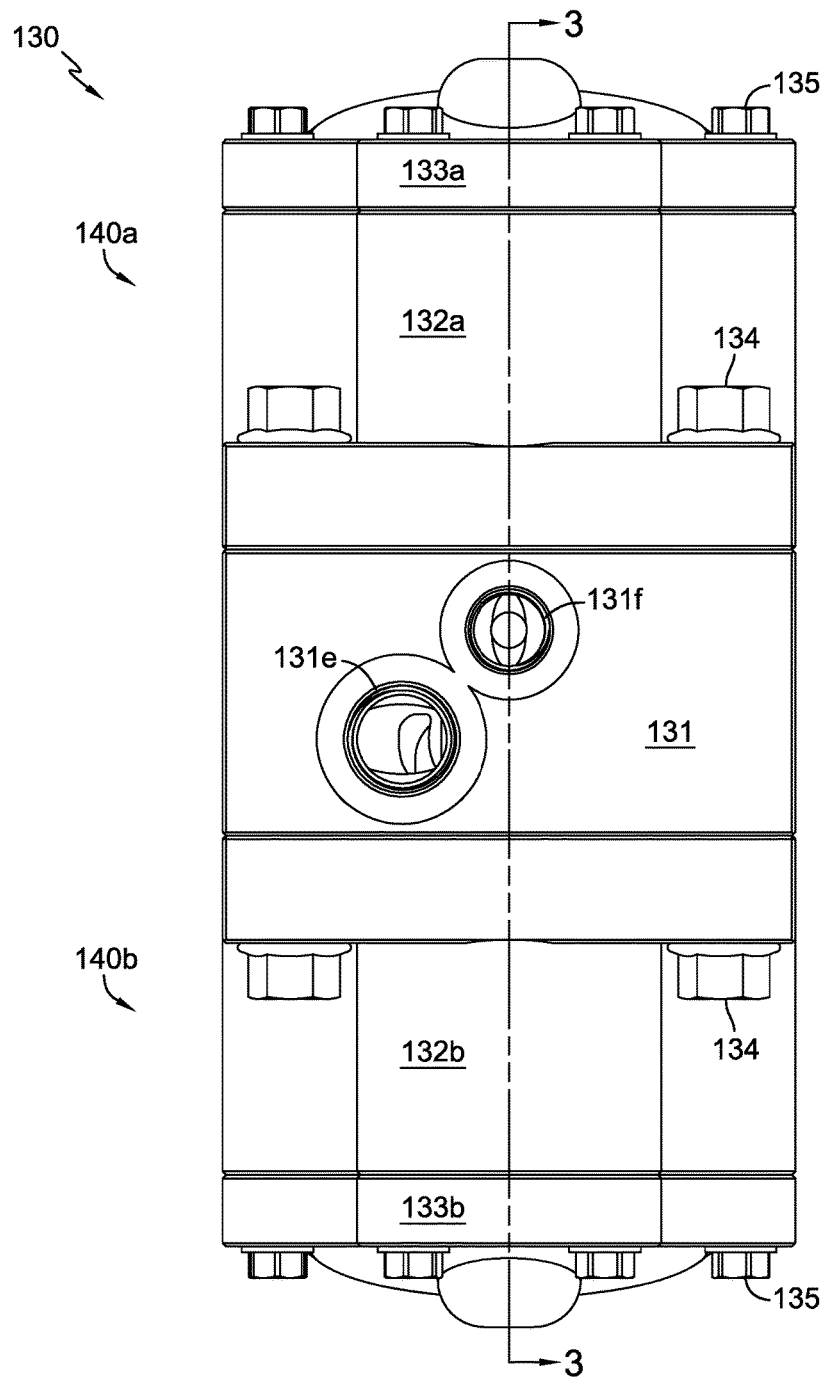
FIG. 2 is a side elevational view of the flow divider assembly of FIG. 1.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. To the extent elements are given numerals that differ in the prefix to those of elements previously described and are not described in detail, it will be understood that such elements can be essentially or substantively identical to the previously described feature. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

Figure 6:
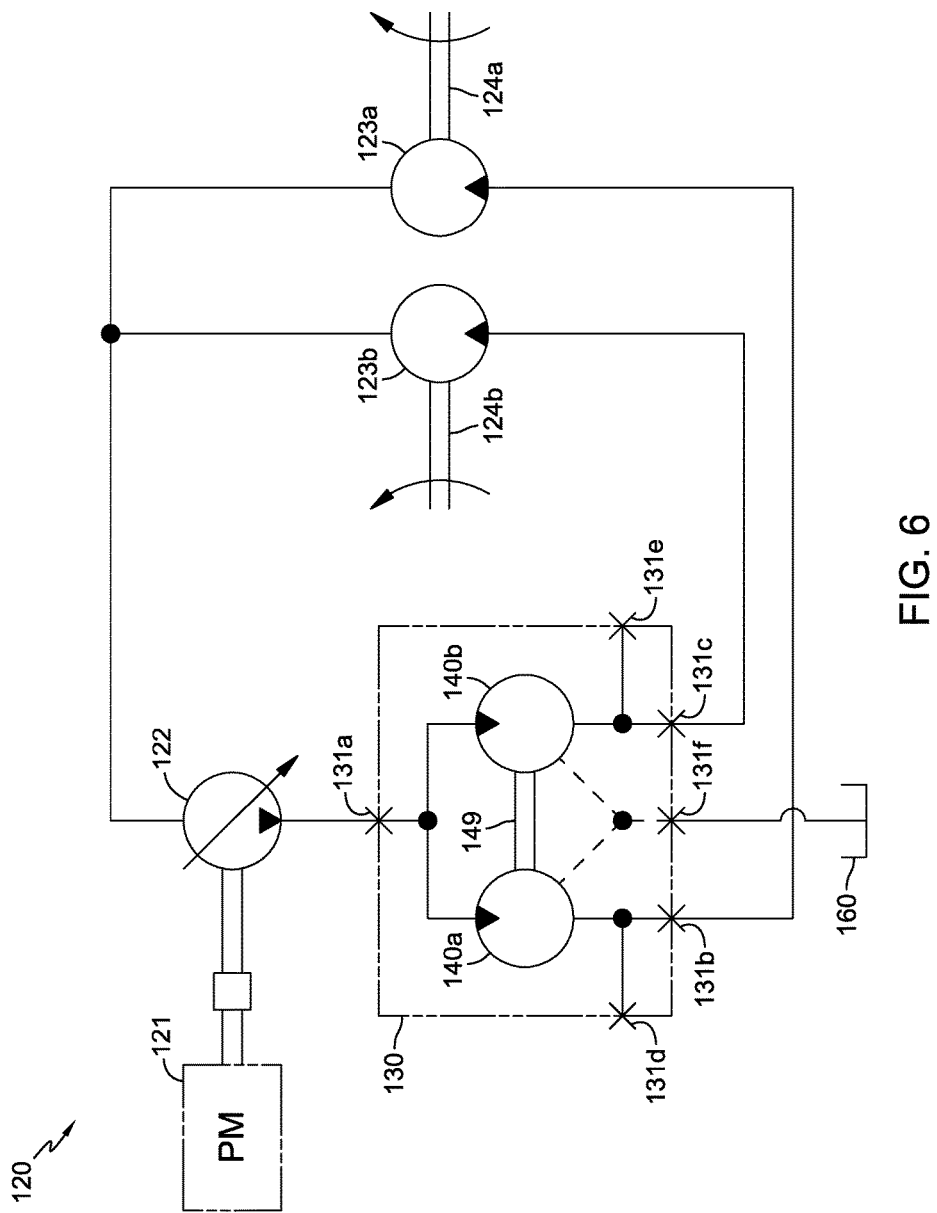
FIG. 6 is a schematic showing an exemplary drive system incorporating the flow divider assembly of FIG. 1.
Figure 7:
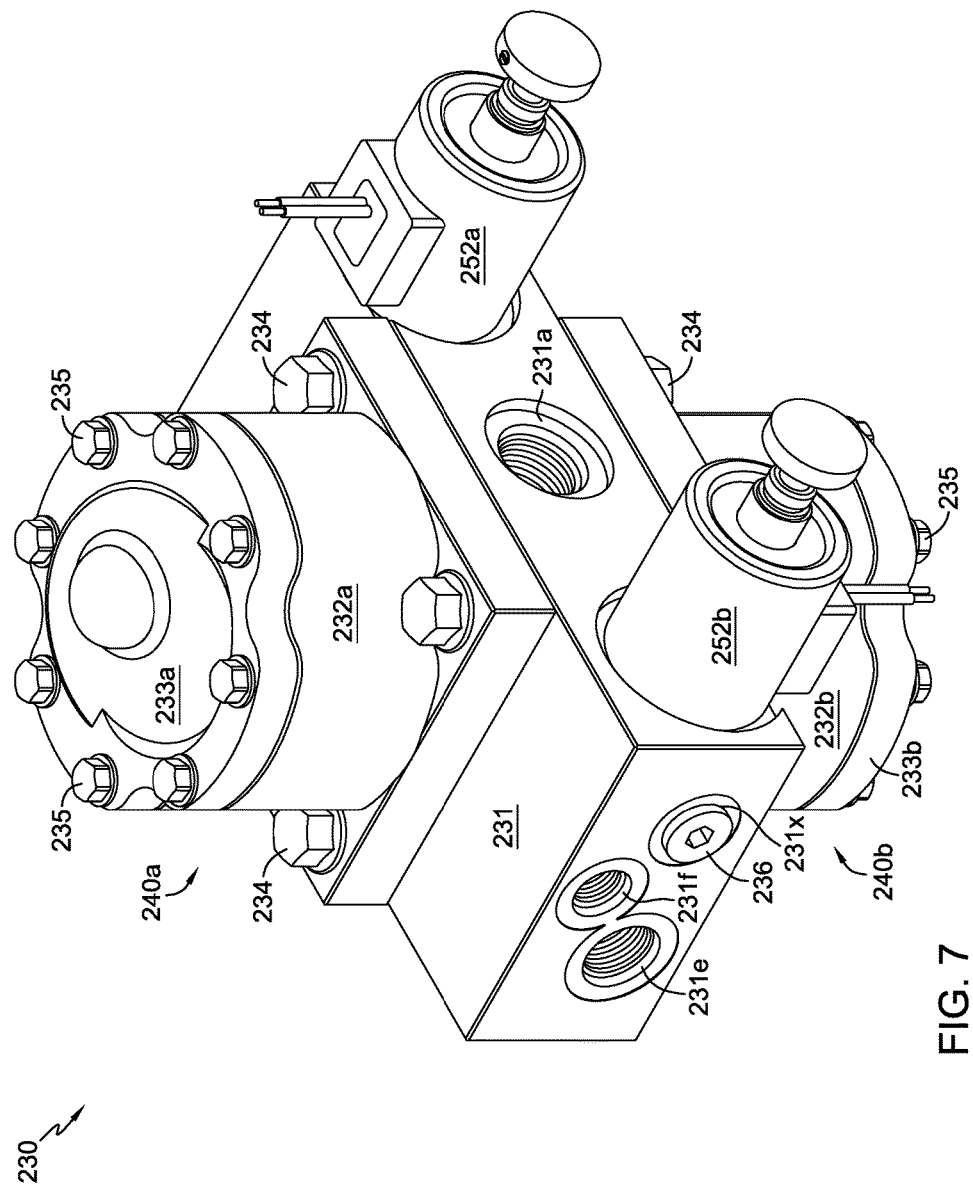
FIG. 7 is a perspective view of a dual motor flow divider assembly in accordance with a second embodiment of the invention.
Figure 8:
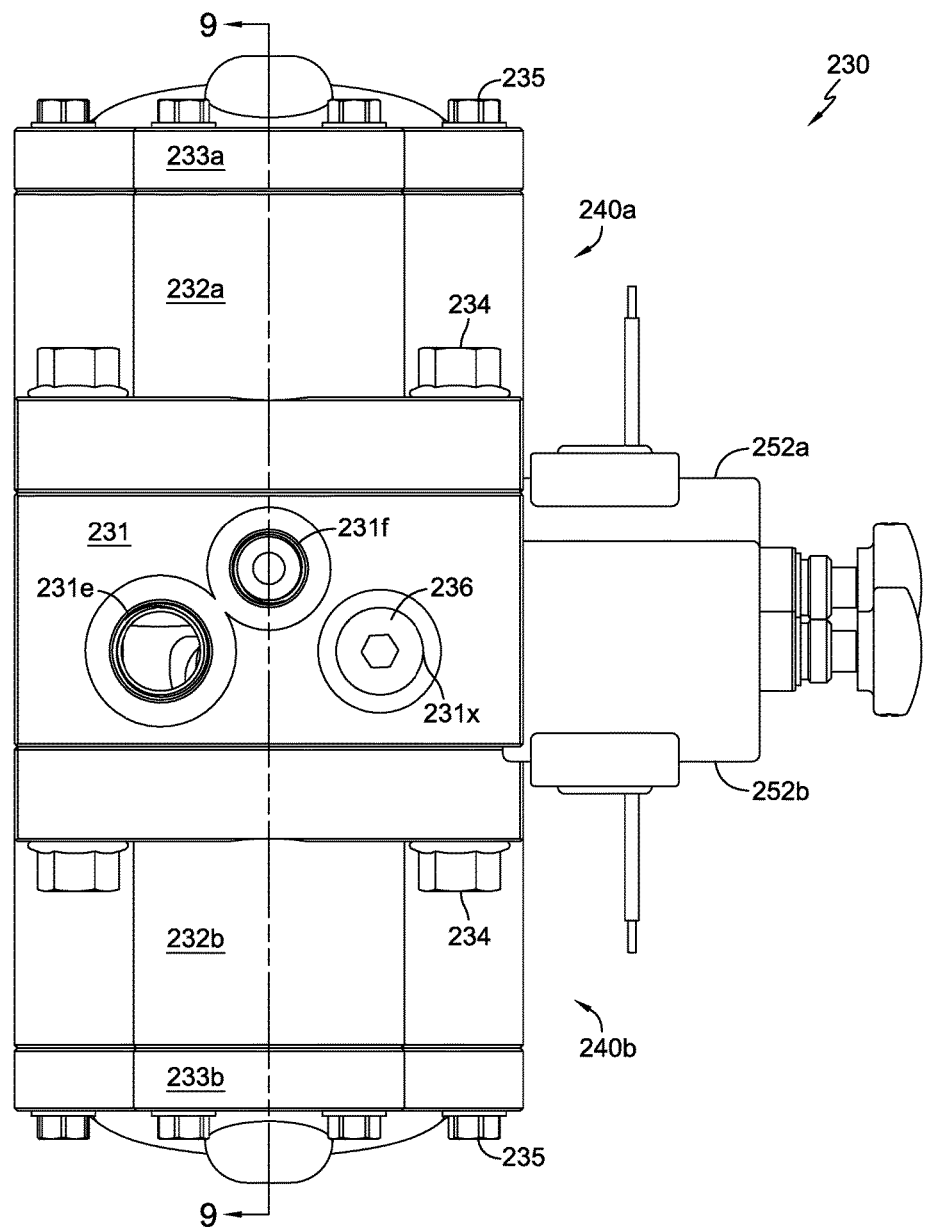
FIG. 8 is a side elevational view of the flow divider assembly of FIG. 7.
Figure 9:
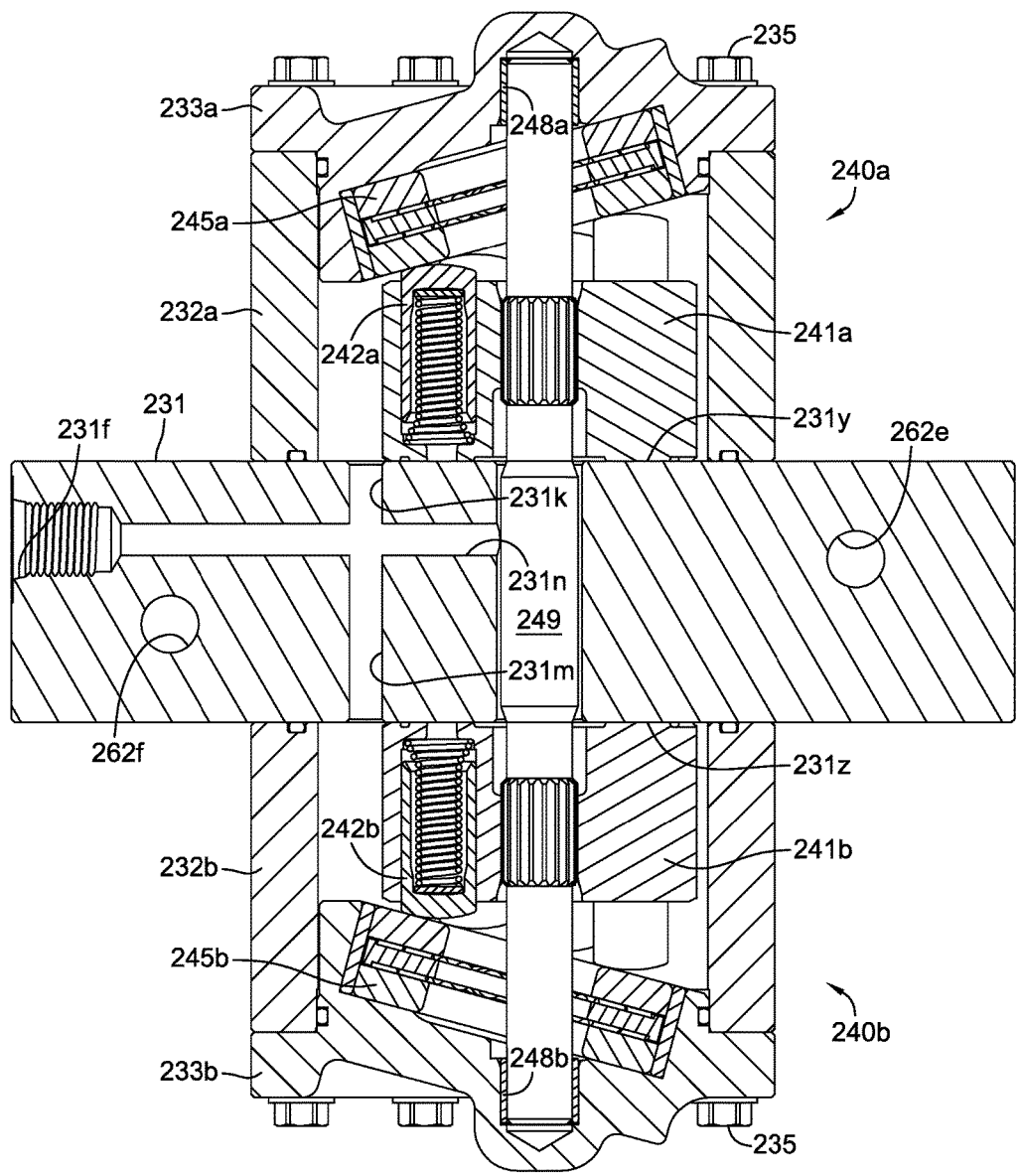
FIG. 9 is a cross-sectional view along the lines 9-9 of FIG. 7.
Figure 10:
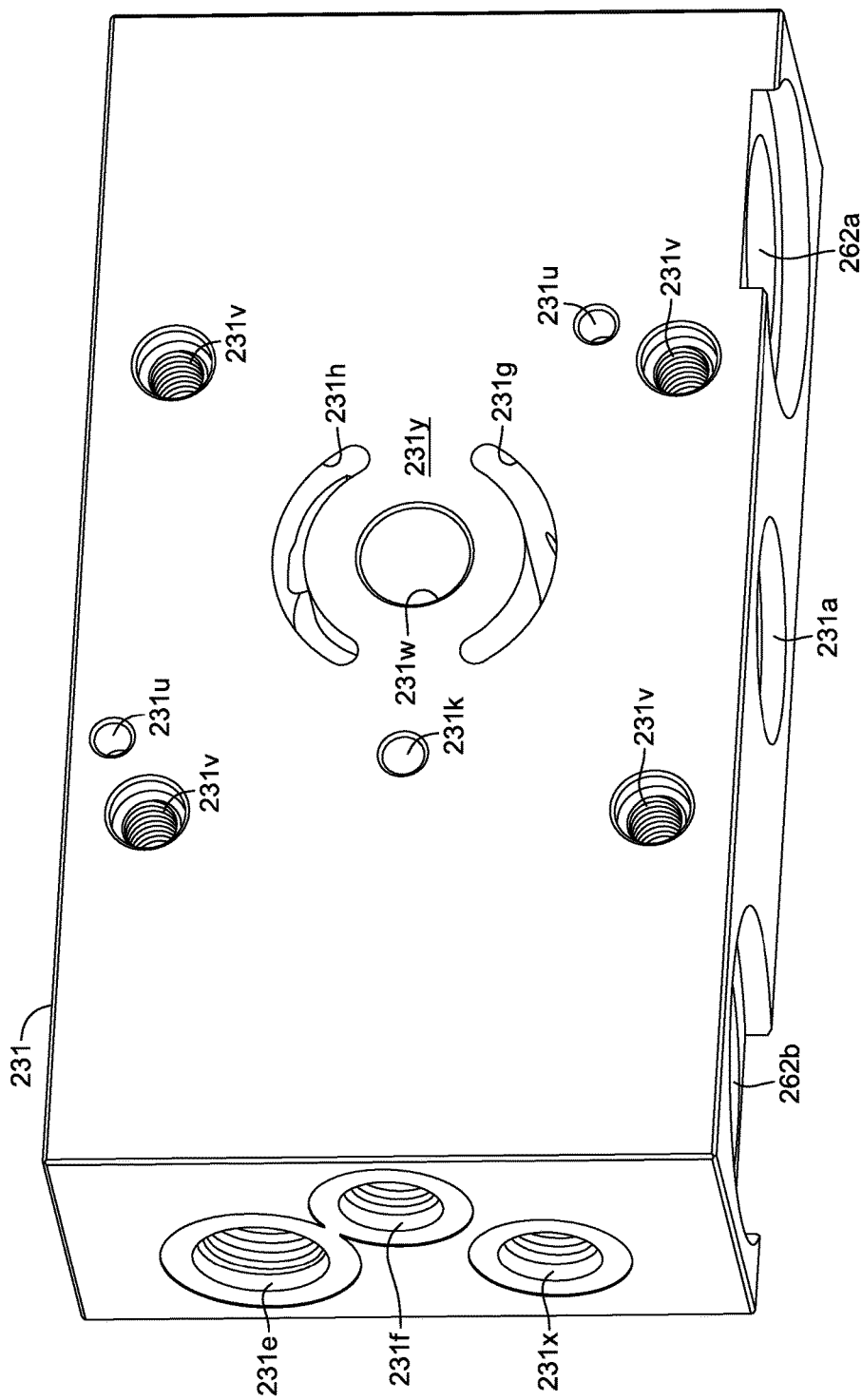
FIG. 10 is a perspective view of a port block as may be used in the flow divider assembly of FIG. 7.
Figure 11:
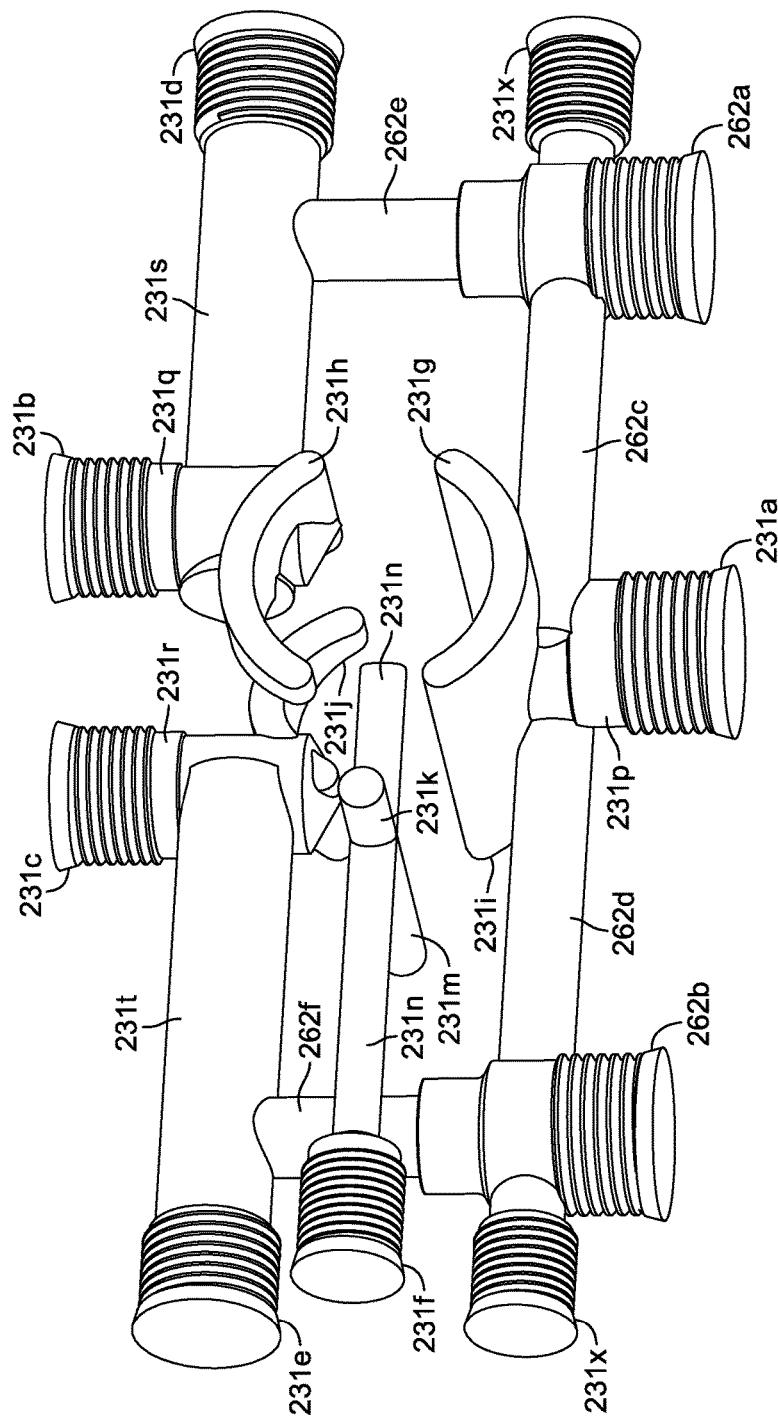
FIG. 11 is a representational, perspective view of the hydraulic porting inside the port block of the flow divider assembly of FIG. 7.
Figure 12:
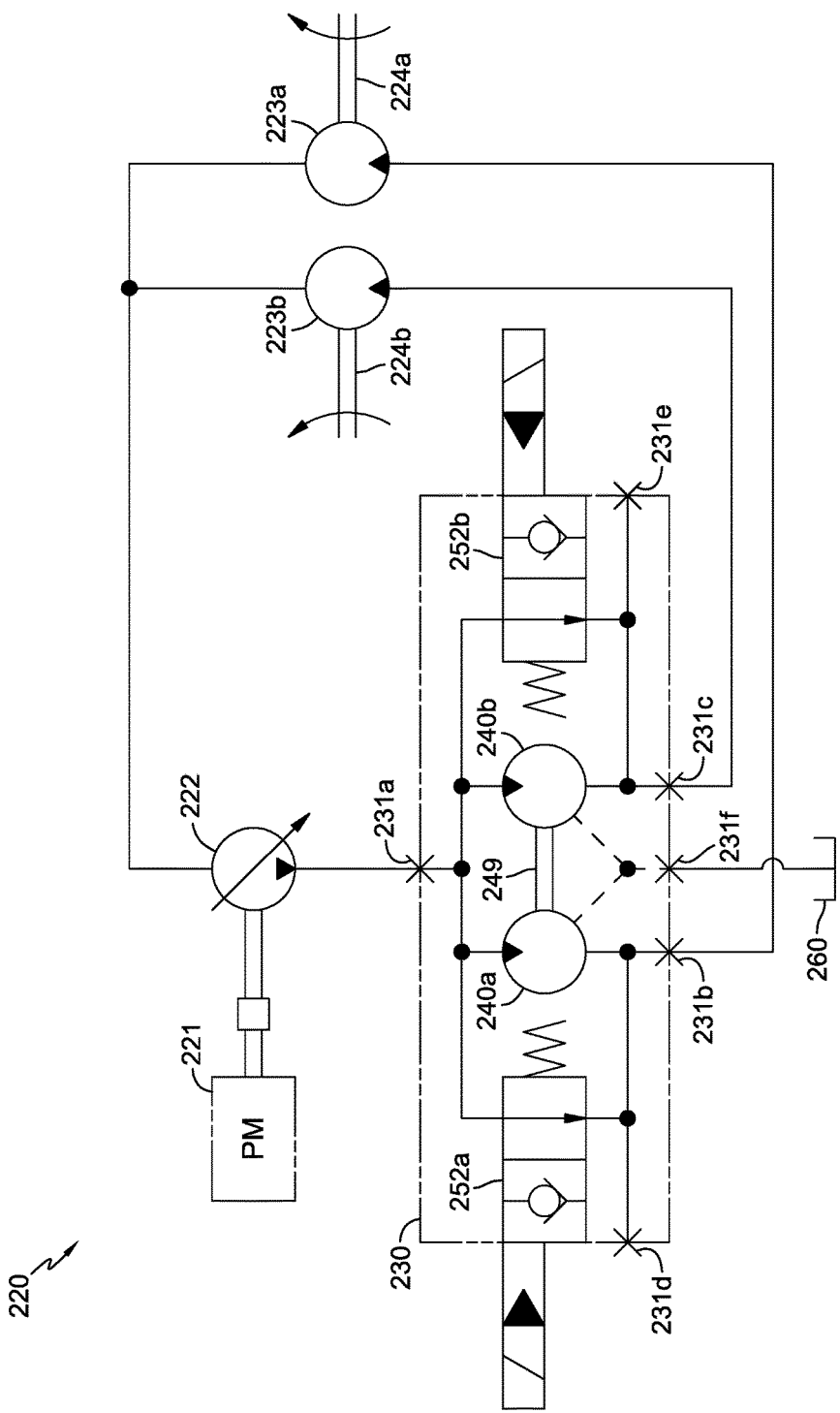
FIG. 12 is a schematic showing an exemplary drive system incorporating the flow divider assembly of FIG. 7.

FIG. 1 depicts a flow divider assembly 130 incorporating a pair of motor assemblies 140a and 140b, which may be referred to as flow divider motors, disposed on a port block 131. The schematic in FIG. 6 shows drive system 120 having flow divider assembly 130 as well as prime mover 121 driving a variable displacement pump 122. The output of flow divider assembly 130 drives a pair of motors 123a, 123b and their respective drive shafts or axles 124a, 124b for a vehicle or other application.

Each motor assembly 140a, 140b comprises a motor housing 132a, 132b having a proximal end secured to the respective opposing faces of port block 131 by means of fasteners 134. Each housing also includes a cap 133a, 133b secured to the distal end of the respective motor housing 132a, 132b by means of fasteners 135. The two motor cylinder blocks 141a and 141b disposed with the respective motor housings 132a, 132b, on a pair of running surfaces 131y (running surface A) and 131z (running surface B) formed on opposing faces of port block 131.

Figure 3:
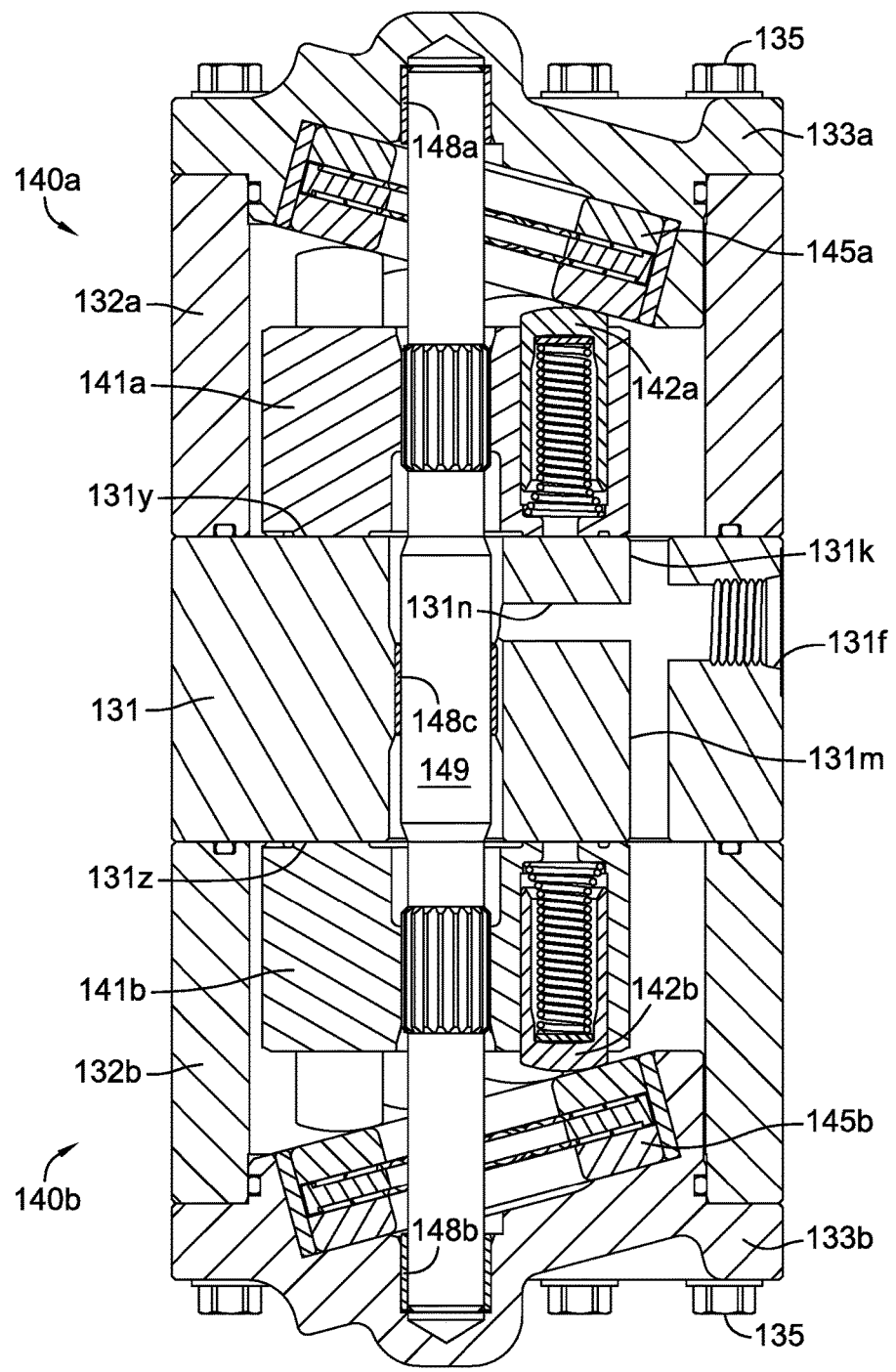
FIG. 3 is a cross-sectional view along the lines 3-3 of FIG. 2.
Figure 4:
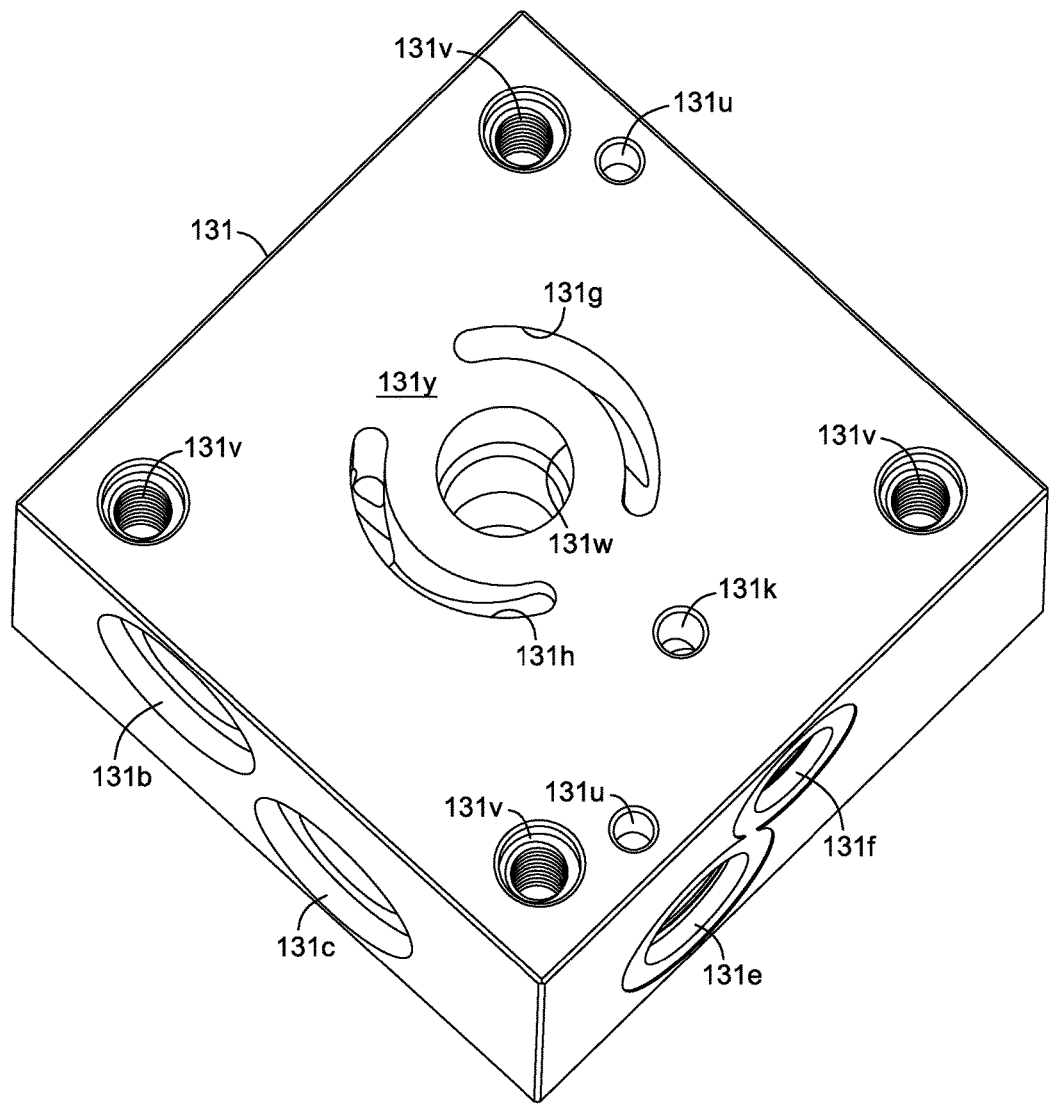
FIG. 4 is a perspective view of a port block as may be used in the flow divider assembly of FIG. 1.
Figure 5:
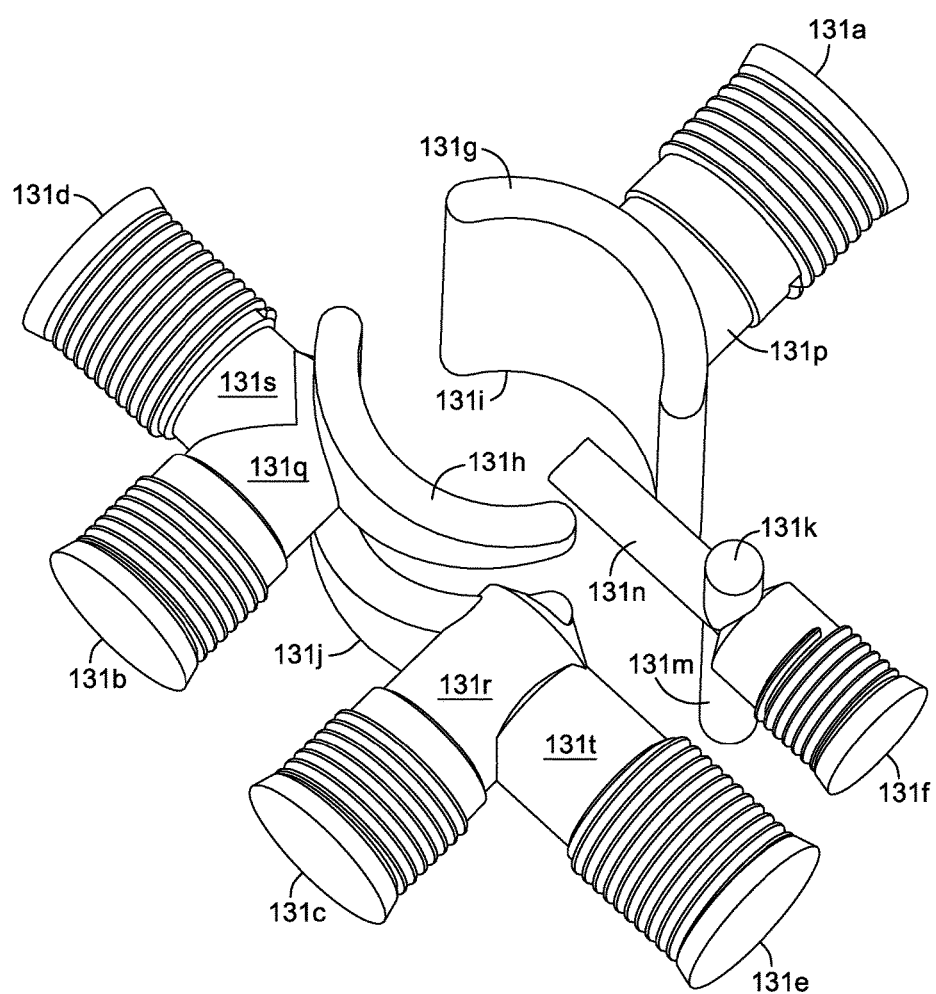
FIG. 5 is a representational, perspective view of the hydraulic porting inside the port block of the flow divider assembly of FIG. 1.

Mounted within each cap 133a, 133b is a thrust bearing 145a, 145b. As shown most clearly in FIG. 3, the two cylinder blocks 141a, 141b include a respective set of motor pistons 142a, 142b engaged to thrust bearings 145a, 145b. Motor shaft 149 extends through port block 131 and engages first motor cylinder block 141a at a first portion of motor shaft 149 and engages second motor cylinder block 141b at a second portion of motor shaft 149. These engagements are depicted herein as splines.

Port block 131 comprises inlet port 131a, outlet port A 131b, outlet port B 131c, kidney inlet port A 131g, kidney outlet port A 131h, kidney inlet port B 131i, kidney outlet port B 131j, inlet passage 131p, outlet passage A 131q; outlet passage B 131r; alignment pin holes 131u; threaded openings 131v and shaft opening 131w. Drain port 131f is connected to drain passage A 131k, drain passage B 131m and central drain passage 131n and exhausts to an external reservoir 160. Two optional outlet ports, namely optional outlet port A 131d and optional outlet port B 131e, are connected to optional outlet passage A 131s and optional outlet passage B 131t, respectively, to provide flexibility in terms of mounting or installation of the unit.

This embodiment is a constant split flow design, with possible variance being introduced by means of changing the ratio of motors 140a and 140b, i.e., by changing the angle of thrust bearing 145a from the axis of rotation of motor shaft 149 with respect to the angle of thrust bearing 145b to that axis, in order to provide different output to drive motors 123a, 123b, or by using motors having different displacements. The user can set the angles of thrust bearings 145a, 145b, depending on the desired output of the respective motors 140a and 140b. The mounting of the thrust bearings in the caps 133a and 133b simplifies such modifications.

The second embodiment of FIGS. 7-12 is similar in many respects to the first embodiment, and as noted above, those elements that may be structurally or operationally identical to those previously described will not be described in detail as such a description is not critical to an understanding of the invention. Flow divider assembly 230 incorporates port block 231, which may be somewhat larger in size than port block 131 to incorporate a pair of valves, and specifically as shown herein electronically actuated solenoid valves 252a and 252b. As shown most clearly in the schematic of FIG. 12, valves 252a and 252b, which may be of a standard design, permit the user to bypass the motors 240a, 240b in the event the user wishes to prevent flow to one of the motors 223a, 223b.

As in the prior embodiment, the output of flow divider assembly 230 drives a pair of motors 223a, 223b and their respective drive shafts or axles 224a, 224b for a vehicle or other application. Each motor assembly 240a, 240b comprises a motor housing 232a, 232b having a cap 233a, 233b secured thereto by means of fasteners 235, and a motor cylinder block 241a, 241b disposed therein and including motor pistons 242a, 242b engaged to thrust bearings 245a, 245b. Motor housings 232a, 232b are fastened to port block 231 by means of fasteners 234. Motor shaft 249 extends through port block 231.

Port block 231 comprises inlet port 231a, outlet port A 231b, outlet port B 231c, kidney inlet port A 231g, kidney outlet port A 231h, kidney inlet port B 231i, kidney outlet port B 231j, inlet passage 231p, outlet passage A 231q; outlet passage B 231r; alignment pin holes 231u; threaded openings 231v, shaft opening 231w, and a pair of running surfaces 231y (running surface A) and 231z (running surface B). Drain port 231f is connected to drain passage A 231k, drain passage B 231m and central drain passage 231n and exhausts to an external reservoir 260. Two optional outlet ports, namely optional outlet port A 231d and optional outlet port B 231e, are connected to optional outlet passage A 231s and optional outlet passage B 231t, respectively, to provide flexibility in terms of mounting or installation of the unit. Machining ports 231x closed by plugs 236 may also be used in assembly.

Figure 13:
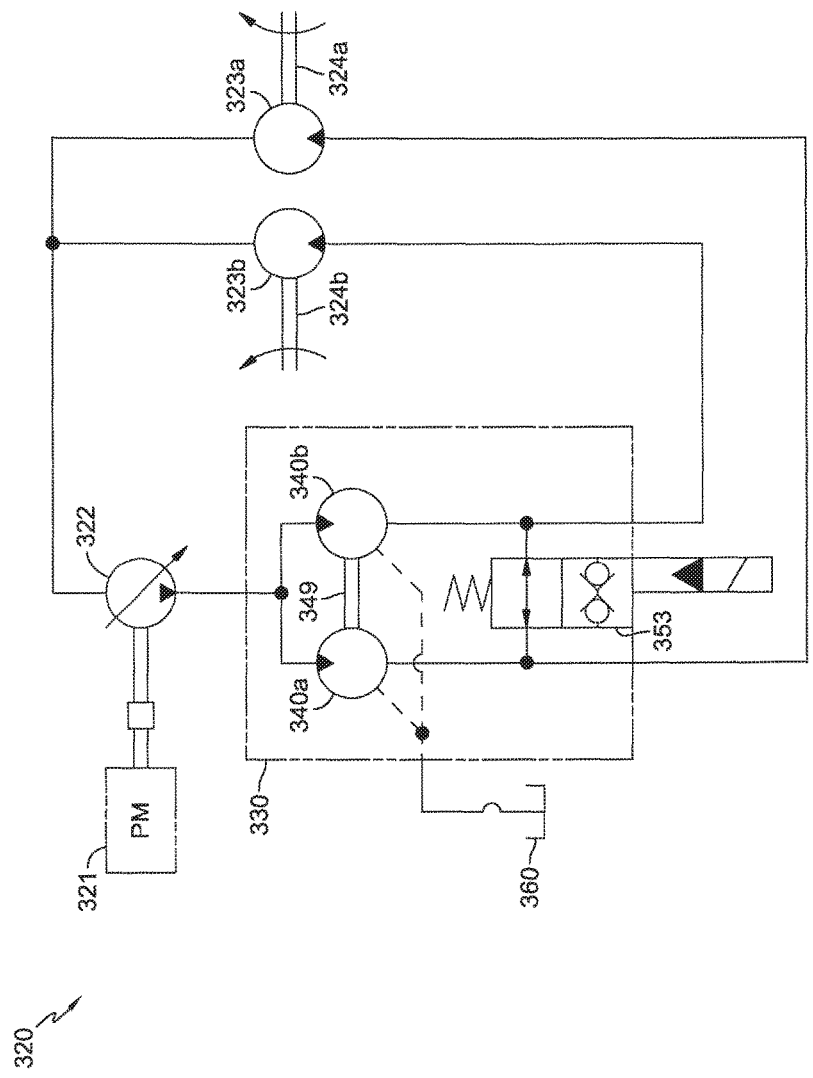
FIG. 13 is a schematic showing an exemplary drive system incorporating a third embodiment incorporating a flow divider in accordance with the principles of the present invention.

A third embodiment is shown schematically in FIG. 13. This embodiment is similar in many respects to the embodiment shown in FIG. 12 but uses a single, bi-directional valve 353 in place of the two valves of the prior embodiment. Valve 353 is preferably a solenoid operated valve and when valve 353 is in the closed position, flow divider assembly 330 will operate substantially the same as flow divider assembly 130 in the first embodiment. When valve 353 is opened, the flow from motors 340a, 340b will take the path of least resistance, in the event that the output of one of the motors 323a, 323b is blocked, for example. As shown, motors 323a, 323b drive respective drive shafts or axles 324a, 324b. Flow divider assembly is also connected to a sump 360, in a manner as set forth previously.

Figure 14:
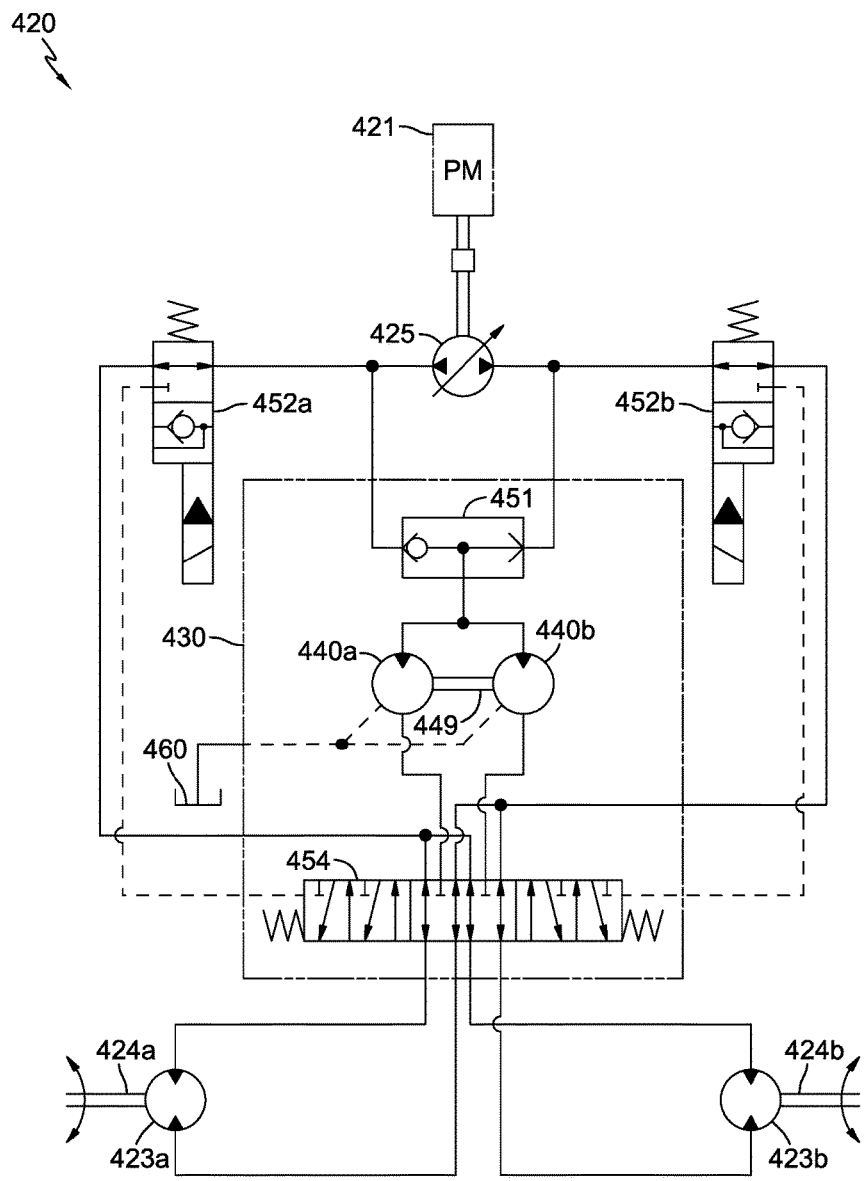
FIG. 14 is a schematic showing an exemplary drive system incorporating a fourth embodiment incorporating a flow divider in accordance with the principles of the present invention.

A fourth embodiment, depicted schematically in FIG. 14, permits the output of the system to be driven in either forward or reverse directions. Drive system 420 includes flow divider assembly 430 as well as prime mover 421 driving a variable displacement pump 425 that has multiple outputs to permit greater control. A pair of two-position bypass valves 452a, 452b, which are depicted herein as solenoid valves, are connected to pump 425 along with flow divider assembly 430. The flow divider assembly incorporates a motor assembly including motors 440a and 440b, a shuttle valve 451 and a three-position, pilot operated valve 454. Shuttle valves 451 and 454 cooperate to permit directional control. The output from valve 454 drives a pair of motors, 423a, 423b and their respective drive shafts or axles 424a, 424b for a vehicle or other application.

As a first example, assume that flow from pump 425 is in the direction toward valve 452b, as shown in FIG. 14. If valve 452b is open as depicted in FIG. 14, the flow bypasses shuttle valve 451 and motors 440a and 440b to flow through the three-position, pilot operated valve 454 and to drive motors 423b, 423a in a first rotational direction, which we will assume to be the forward direction. It will be understood that pilot operated valve 454 is spring biased to this first position. In this example, flow from the two motors 423a, 423b returns to pump 425 through the other valve 452a. If, on the other hand, valve 452b is closed, flow is directed to shuttle valve 451 which, as is known in the art, will open to the fluid side which is under pressure. Flow is directed from shuttle valve 451 through flow divider motors 440a, 440b, which are connected by motor shaft 449. The flow is then directed to the pilot operated valve 454 from the flow divider motors 440a and 440b. In this example, the closing of valve 452b provides a pilot signal to valve 454, such that valve 454 shifts left so that flow is directed through valve 454 to drive motors 423a and 423b in the first, forward, direction.

In this embodiment, if flow from pump 425 is in the opposite direction from the direction shown in FIG. 14, the flow travels towards valve 452a and the flow to drive motors 423a and 423b may be reversed, moving the motors 423a, 423b in a second, or reverse, rotational direction. As before, if flow is directed toward valve 452a and valve 452a is open, flow bypasses the shuttle valve 451 and the motors 440a and 440b to flow through the three-position valve 454 in the same manner described above, but motors 423a and 423b will move in a second, or reverse direction from the prior example.

If, on the other hand, flow is directed towards valve 452*a* and valve 452*a* is closed, flow is directed to shuttle valve 451 and then to motors 423*a*, 423*b* in a manner similar to that described before, but the pilot operated valve 454 is triggered by the closure of valve 452*a* to shift to the right, so that flow is directed through valve 454 to drive motors 423*a* and 423*b* in the second or reverse direction. In this example, flow returns to pump 425 through the other valve 452*b*. Both valves 425*a*, 425*b* include check valves to permit this return flow in the event the valve is closed. As before, motors 440*a*, 440*b* are also connected to a sump 460.

Figure 15:
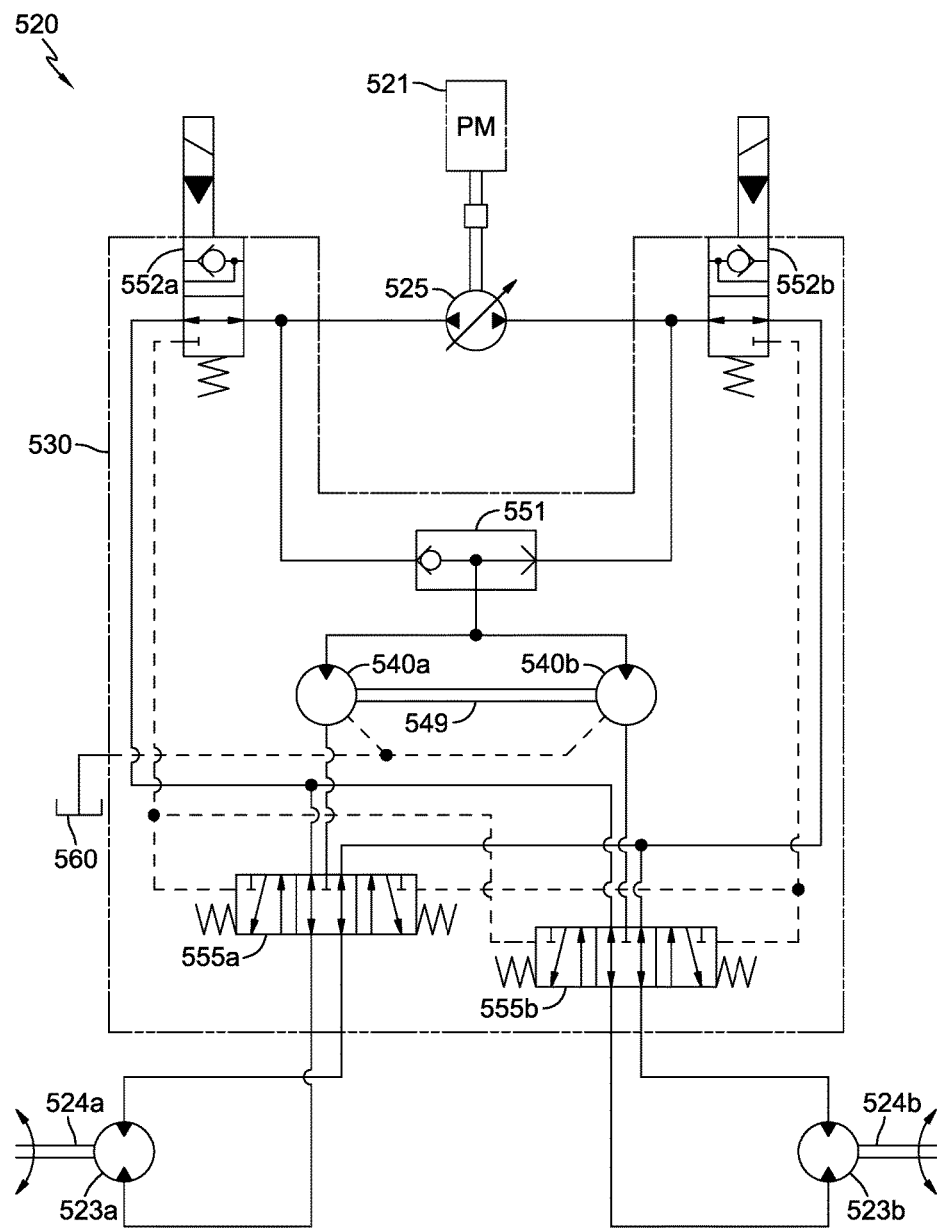
FIG. 15 is a schematic showing an exemplary drive system incorporating a fifth embodiment incorporating a flow divider in accordance with the principles of the present invention.
Figure 16:
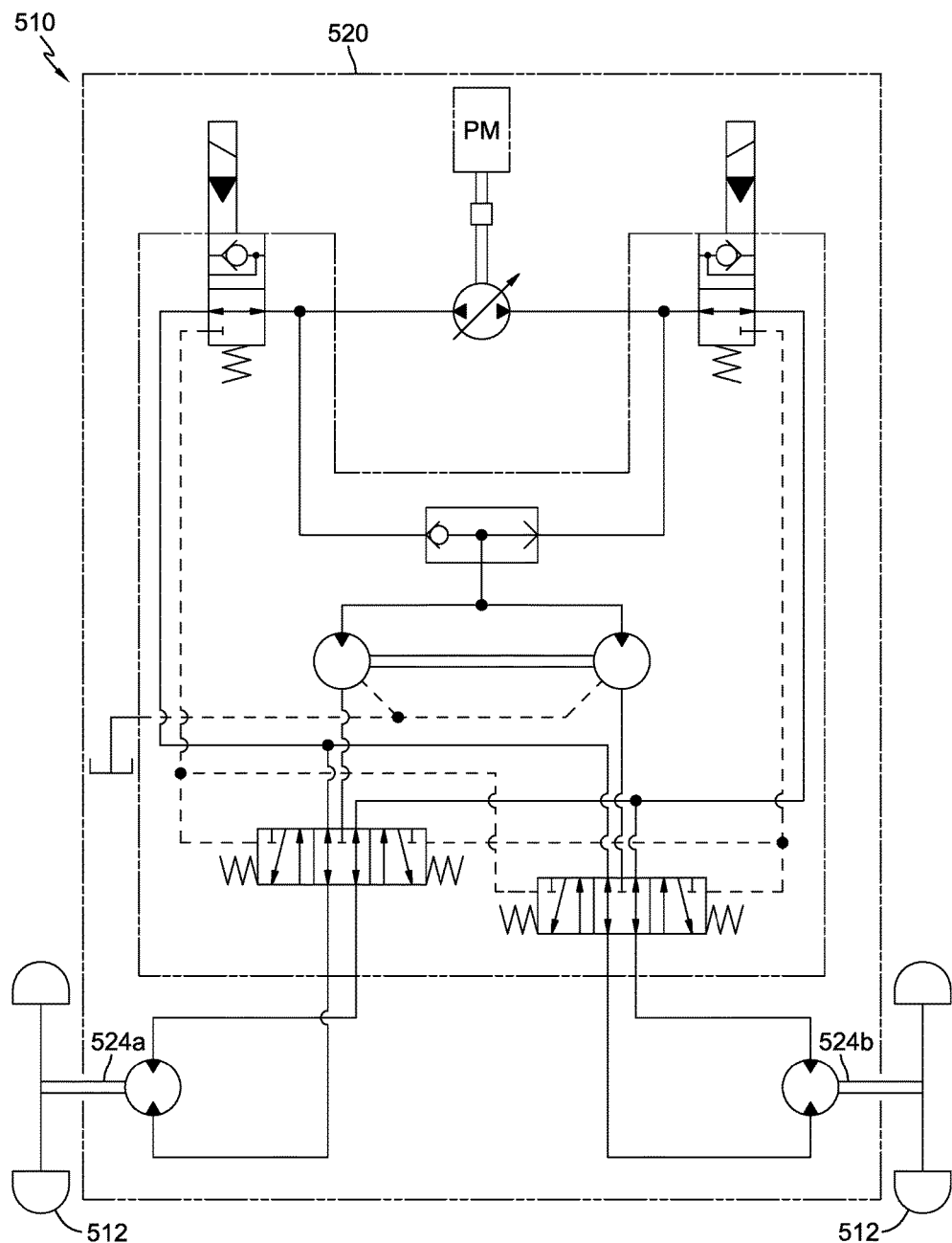
FIG. 16 is a schematic showing the drive system of FIG. 15 in connection with a vehicle.

A fifth embodiment is depicted schematically in FIGS. 15 and 16. The schematic in FIG. 15 shows drive system 520 which is similar in many respects to the prior embodiment. Again, a prime mover 521 is driving a variable displacement, bi-directional pump 525. Flow divider assembly 530 includes a pair of bypass valves 552*a*, 552*b* connected to pump 525. These bypass valves 552*a*, 552*b* are depicted herein as solenoid valves and in this embodiment are incorporated directly into the flow divider assembly 530. As before, flow divider assembly 530 incorporates a shuttle valve 551 and a motor assembly including motors 540*a* and 540*b*. The output of flow divider assembly 530 drives a pair of motors 523*a*, 523*b* and their respective drive shafts or axles 524*a*, 524*b* for a vehicle or other application. In this embodiment, the function of pilot valve 454 is split into two separate pilot actuated valves 555*a* and 555*b*. The use of the simpler valves 555*a* and 555*b* in place of the more complicated valve 454 may reduce cost and complexity. The first pilot operated valve 555*a* is operably connected to the first motor 540*a* and to both valves 552*a* and 552*b*, while the second pilot operated valve 555*b* is operably connected to the second motor 540*b* and both valves 552*a* and 552*b*.

Pump 525 is a bidirectional flow pump. As an example similar to that described above with respect to FIG. 14, assume flow is directed towards valve 552*b* as depicted in FIG. 15. If valve 552*b* is open, flow bypasses shuttle valve 551 and motors 540*a* and 540*b* to flow through valves 555*a* and 555*b* to drive motors 523*b*, 523*a* in a first, or forward, direction, as depicted in the figure. In this example, flow returns to pump 525 through the other valve 552*a*. If, on the other hand, valve 552*b* is closed, flow is directed to shuttle valve 551 and then to motors 540*a*, 540*b* of the flow divider, which are connected by motor shaft 549. In this case, both pilot actuated valves 555*a* and 555*b* are piloted to shift to the left, such that flow from motors 540*a*, 540*b* flows to output motors 523*a*, 523*b* in the first or forward direction.

If flow is directed in the opposite direction, towards valve 552*a*, and valve 552*a* is open, the flow is directed to valves 555*a*, 555*b* and then to motors 523*a*, 523*b*, which will operate in the second, reverse direction. Similarly, if flow is directed towards valve 552*a*, and valve 552*a* is closed, flow is directed to shuttle valve 551 and then to motors 540*a*, 540*b* of the flow divider. In this case, both pilot actuated valves 555*a* and 555*b* are piloted to shift to the right, such that flow from motors 540*a*, 540*b* flows to the output motors 523*a*, 523*b* in the second, reverse direction. As before, motors 540*a*, 540*b* are also connected to a sump 560.

FIG. 16 depicts the fifth embodiment in connection with vehicle 510 to demonstrate the applicability of the inventions disclosed herein to such applications. Motors 523*a* and 523*b* drive respective output shaft 524*a* and 524*b* which, in a vehicle, may be axles 524*a* and 524*b* driving vehicle wheels 512. The operation would otherwise be the same as described with respect to FIG. 15.

Figure 17:
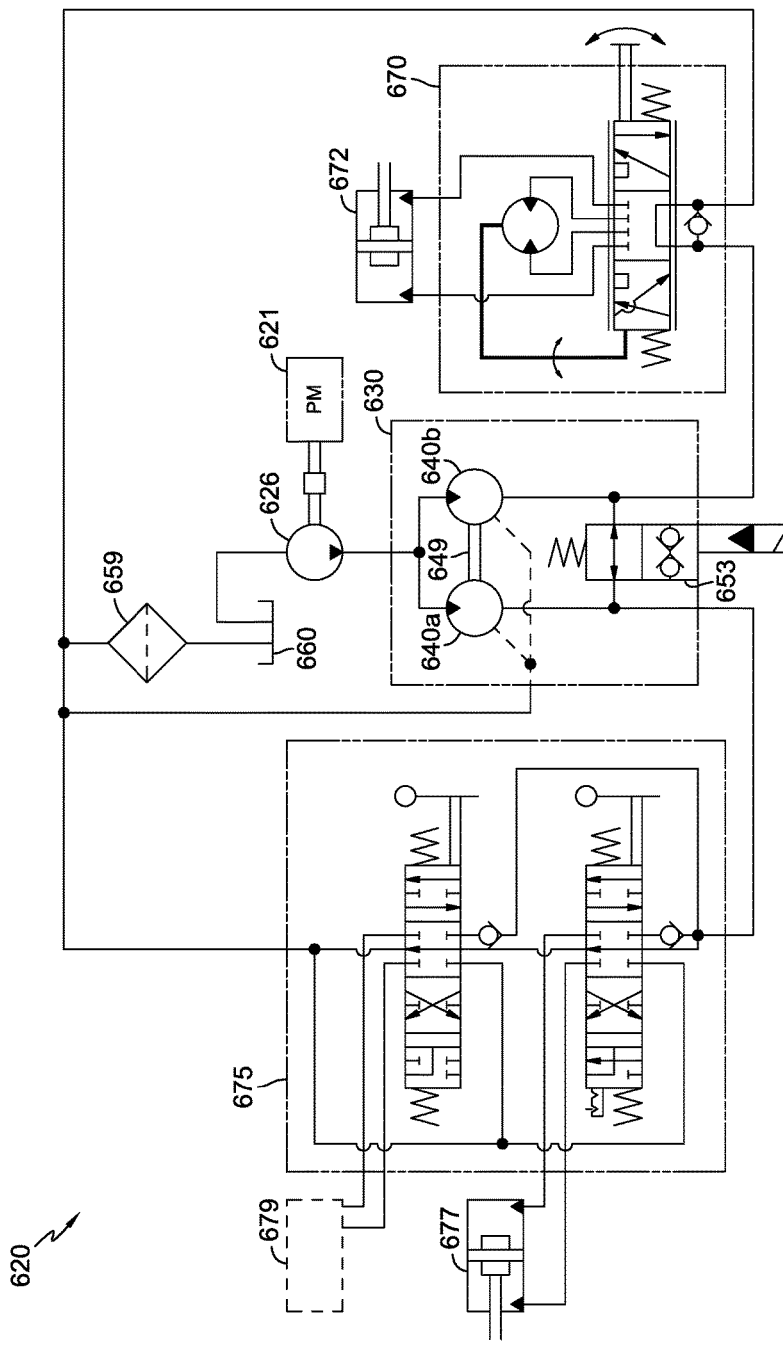
FIG. 17. is a schematic showing an exemplary drive system showing the drive system of FIG. 13 in connection with auxiliary applications.

FIG. 17 depicts a sixth embodiment in connection with auxiliary applications to demonstrate the applicability of the inventions disclosed herein to such applications. Drive system 620 includes flow divider assembly 630 as well as prime mover 621 driving a single direction fixed displacement pump 626; one could also use a single direction pressure compensated pump in place of pump 626. The flow divider assembly 630 includes motors 640*a* and 640*b*, which are connected by motor shaft 649, and the two-position, bi-directional valve 653, depicted herein as a solenoid valve similar to that depicted in FIG. 13. When the valve 653 is open, as depicted in FIG. 17, flow is directed in the path of least resistance to the auxiliary systems. When the valve 653 is closed equal flow is provided to both outputs of the flow divider system. In this example, the output of flow divider assembly 630 drives a steering control unit 670 and a steering cylinder 672 along with the auxiliary control valves 675 connected to a lift or bucket cylinder 677. In other embodiments, the output of the flow divider assembly 630 drives other auxiliary systems.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof. For example, while certain embodiments are shown schematically, it will be understood that the basic structural elements can be similar in many respects to those of the earlier embodiments.

What is claimed is:

1. A flow divider assembly for use with a hydraulic system including a hydraulic pump capable of providing hydraulic fluid alternatively to a first fluid side and a second fluid side, a first drive motor and a second drive motor, the flow divider assembly comprising:
    a shuttle valve connected to the first fluid side and the second fluid side, wherein the shuttle valve opens in a first direction when the first fluid side is under pressure and the shuttle valve opens in a second direction when the second fluid side is under pressure;
    a first flow divider motor in communication with an output of the shuttle valve and a second flow divider motor in communication with the output of the shuttle valve;
    a first bypass valve connected to the first fluid side and having an open position and a closed position;
    a second bypass valve connected to the second fluid side and having an open position and a closed position; and
    a multi-position valve operably connected to both flow divider motors and to both the first bypass valve and the second bypass valve, the multi-position valve having a first position where it is hydraulically connected to both the first bypass valve and the second bypass valve, a second position where the multi-position valve is capable of receiving hydraulic fluid from the first bypass valve, and a third position where the multi-position valve is capable of receiving hydraulic fluid from the second bypass valve.

2. The flow divider assembly of claim 1, further comprising a single motor shaft engaged to both the first flow divider motor and the second flow divider motor.

3. The flow divider assembly of claim 1, wherein the first bypass valve and the second bypass valve each consist of electronically actuated solenoid valves.

4. The flow divider assembly of claim 3, wherein the first bypass valve and the second bypass valve each include a check valve to permit return flow from the multi-position valve to the hydraulic pump.

5. The flow divider assembly of claim 4, further comprising a sump connected to the first flow divider motor and the second flow divider motor.

6. The flow divider assembly of claim 4, wherein the multi-position valve comprises a pilot operated valve.

7. The flow divider assembly of claim 4, wherein the multi-position valve is biased to the first position.

8. The flow divider assembly of claim 1, wherein the multi-position valve comprises a first pilot operated valve operably connected to the first flow divider motor and both bypass valves, and a second pilot operated valve operably connected to the second flow divider motor and both bypass valves.

9. A flow divider assembly for use with a hydraulic system including a hydraulic pump capable of providing hydraulic fluid alternatively to a first fluid side and a second fluid side, a first drive motor and a second drive motor, the flow divider assembly comprising:
- a shuttle valve connected to the first fluid side and the second fluid side, wherein the shuttle valve opens in a first direction when the first fluid side is under pressure and the shuttle valve opens in a second direction when the second fluid side is under pressure;
- a flow divider in communication with an output of the shuttle valve;
- a first bypass valve connected to the first fluid side and having an open position and a closed position;
- a second bypass valve connected to the second fluid side and having an open position and a closed position; and
- a multi-position valve operably connected to the flow divider and to both the first bypass valve and the second bypass valve, and having a plurality of positions.

10. The flow divider assembly of claim 9, wherein the flow divider comprises a first flow divider motor in communication with an output of the shuttle valve and a second flow divider motor in communication with the output of the shuttle valve, and the multi-position valve is connected to both the first flow divider motor and the second flow divider motor.

11. The flow divider assembly of claim 10, further comprising a single motor shaft engaged to both the first flow divider motor and the second flow divider motor.

12. The flow divider assembly of claim 10, wherein the multi-position valve comprises a first pilot operated valve operably connected to the first flow divider motor and both bypass valves, and a second pilot operated valve operably connected to the second flow divider motor and both bypass valves.

13. The flow divider assembly of claim 9, wherein the first bypass valve and the second bypass valve each consist of electronically actuated solenoid valves.

14. The flow divider assembly of claim 13, wherein both bypass valves include check valves to permit return flow to the hydraulic pump.

15. The flow divider assembly of claim 9, wherein the multi-position valve comprises a pilot operated valve, and the pilot operated valve is biased to a first position.

16. A hydraulic system for use with a vehicle having a first driven wheel and a second driven wheel, the hydraulic system comprising:
- a hydraulic pump capable of providing hydraulic fluid alternatively to a first fluid side and a second fluid side;
- a first drive motor driving a first output shaft, the first output shaft driving the first driven wheel, and a second drive motor driving a second output shaft, the second output shaft driving the second driven wheel;
- a flow divider assembly hydraulically connected to the first drive motor and the second drive motor, and comprising:
    - a shuttle valve connected to the first fluid side and the second fluid side;
    - a first flow divider motor and a second flow divider motor, both in communication with an output of the shuttle valve;
    - a first bypass valve connected to the first fluid side, the first bypass valve having an open position and a closed position;
    - a second bypass valve connected to the second fluid side and the second bypass valve having an open position and a closed position; and
    - a pilot operated valve assembly operably connected to both flow divider motors and both the first bypass valve and the second bypass valve, and having a plurality of positions, the pilot operated valve assembly being biased to a first position.

17. The hydraulic system of claim 16, further comprising a single motor shaft engaged to both the first flow divider motor and the second flow divider motor.

18. The hydraulic system of claim 17, wherein the first bypass valve and the second bypass valve each consist of electronically actuated solenoid valves.

19. The hydraulic system of claim 18, wherein the first bypass valve and the second bypass valve include check valves to permit return flow to the hydraulic pump.

20. The hydraulic system of claim 19, wherein the pilot operated valve assembly comprises a first pilot operated valve operably connected to the first flow divider motor and both bypass valves, and a second pilot operated valve operably connected to the second flow divider motor and both bypass valves.

* * * * *